Patented Feb. 10, 1948

2,435,690

UNITED STATES PATENT OFFICE 2,435,690

INSECTICIDE

Henry L. Morrill, Clayton, Mo., and Carl J. Weinman, Champaign, Ill., assignors to Monsanto Chemical Company, St. Louis, Mo., a corporation of Delaware No Drawing. Application July 5, 1944, Serial No. 543,607

4 Claims. (Cl. 167—24)

This invention relates to insecticides and particularly to a composition that possesses insecticidal and insectifugal properties.

The object of this invention is to provide a composition of matter that possesses a pronounced toxic and repellent effect on flies and other household insects.

Another object of this invention is to produce a novel oil base insecticide composition containing ortho-nitro-diphenyl and pyrethrins.

Other objects will become apparent from the following description and examples.

According to the present invention, generally stated, the new insecticide composition comprises a petroleum oil base containing pyrethrins, ortho-nitrodiphenyl and a mutual solvent for ortho-nitrodiphenyl and the oil base.

Solutions of pyrethrins in an oil base such as a kerosene fraction having a viscosity of 60–100° Saybolt at 100° F. are effective in knocking down and killing flies. However, the concentration of pyrethrins required to produce the desired effect to a satisfactory extent is about 150–160 mg. per 100 cc. of the spray composition. It has now been found that efficient sprays may be formulated by replacing a substantial portion of the pyrethrins with ortho-nitrodiphenyl. The resulting spray has been found to possess a very high knock-down and kill of insects such as houseflies, and in fact, the composition possesses a toxicity in excess of that of a pyrethrin solution which does not contain ortho-nitrodiphenyl. Ortho-nitrodiphenyl has substantially little knock-down value in itself. However, the composition containing both ortho-nitrodiphenyl and pyrethrins, even where the pyrethrin content is substantially reduced, has been found to be even more effective in kill and knock-down than the pyrethrins alone in the kerosene base.

In order to utilize ortho-nitrodiphenyl as a component of the novel spray of the present invention, it has been found necessary to provide an organic solvent which is a mutual solvent for ortho-nitrodiphenyl and the oil base. The mutual solvent may be relatively non-toxic to insects in itself at low concentrations. Typical substances suitable for this purpose are alkylated naphthalenes such as alpha-methylnaphthalene, certain dialkylnaphthalenes and mixtures of alkylated naphthalenes, substituted cyclohexanols such as ortho-phenylcyclohexanol or ortho-cyclohexylcyclohexanol; glycol ethers such as ethyleneglycol-monobutyl ether; ketones such as methylethyl ketone or methyl-isopropyl ketone; aryl ethers such as anisole, phenetole, or diphenyl ether; nitro-paraffins such as 1-nitropropane, 2-nitro-propane and 1-nitrobutane; alcohols such as butanol; and pine oil. If the solvent employed for ortho-nitrodiphenyl is suitable in itself as an oil base for the spray composition, the addition of an oil base, such as kerosene, as a third component of the composition may be eliminated.

The quantity of pyrethrins in the composition of the present invention may be varied over a wide range, for example, 20–100 mg. per 100 cc. of the composition. The preferred range of pyrethrins is 20–50 mg. per 100 cc. of the composition. The quantity of ortho-nitrodiphenyl in the composition may be varied over the range of 2½–15% by weight of the composition. The preferred range is 5–10%. The quantity of mutual solvent for ortho-nitrodiphenyl and the oil base may be varied over a wide range, for example, from several times the amount of ortho-nitrodiphenyl to half the amount of ortho-nitrodiphenyl, or even less. The minimum quantity of mutual solvent is that amount which will retain in the oil base solution the amount of ortho-nitrodiphenyl which is present in the composition.

The oil base employed in formulating the insecticidal compositions of the present invention may be selected from a wide variety of paraffin base oils having a desirable volatility range and viscosity for use in insecticidal sprays. In addition, the oil base is desirably one which has been substantially de-odorized and which has been treated to remove acidic and other corrosive constituents that are harmful to various materials and to higher forms of life with which the composition may come into contact upon use. The oil base is preferably a purified mineral oil or white oil such as is obtained by treating viscous mineral oils with sulfuric acid until all odorous and other undesirable ingredients have been removed. The oil may suitably have a viscosity of from 60° Saybolt to 380° Saybolt (at 100° F.) or higher, but preferably from about 75°–100°.

The following example will serve to illustrate the compositions of the present invention. This example is to be construed merely as illustrative and not as limiting the scope of the invention.

Example

Ortho-nitrodiphenyl _____ per cent__ 5
Mixture of methylated naphthalenes, including alpha-methylnaphthalene _____ per cent__ 5
Pyrethrins _____ mg.__ 20–50
Deodorized kerosene fraction having a viscosity of 60° Saybolt at 100° F _____ cc__ 100

The composition may be prepared in any manner desired. For example, the pyrethrins may be in the form of an extract. A portion of extract containing the desired quantity of pyrethrins may be dissolved in the kerosene fraction. To this solution may be added a solution of ortho-nitrodiphenyl in the mutual solvent. Mutual solvents other than the one provided in the aforescribed compositions may be employed, for example, ortho-cyclohexylcyclohexanol, ortho-phenylcyclohexanol, or the butyl ether of ethyleneglycol. The following table shows the compositions together with the toxicity ratings. The ratings are given in terms of OTI values. The OTI value is the result obtained by subtracting the percent kill with an official test insecticide from the percent kill with the composition under observation. The official test insecticide is a solution of 100 mg. of pyrethrins in 100 cc. of an oil base standardized by the National Association of Insecticide and Disinfectant Manufacturers. An OTI rating of −5 to +5 designates an insecticide composition as being in class B; a rating of +6 to +15 designates a class A insecticide; and a rating of +16 or greater designates a class AA insecticide. Those in class A are superior, of course, to those in class B, and likewise, those in class AA are superior to those in class A.

| Pyrethrins (mg./100 cc. of spray) | OTI rating (Houseflies, 24 hour kill) | |
|---|---|---|
| | No ortho-nitrodiphenyl | 5% ortho-nitrodiphenyl, 5% alkylated naphthalene |
| 10 | −47 | |
| 20 | | +23 |
| 30 | | +24 |
| 40 | −22 | +29 |
| 50 | −11 | +34 |
| 100 | 0 | |
| 150 | +19 | |
| 160 | +22 | |

It is evident from the foregoing table that in each instance where pyrethrins were present in the amount of 20–50 mg., the OTI rating of the composition without ortho-nitrodiphenyl was very low, whereas the OTI rating of the composition containing 5% ortho-nitrodiphenyl was that of a class AA spray. Moreover, an equivalent result with pyrethrins alone in the oil base was not attained even when the pyrethrins were present in amounts of 150–160 mg. per 100 cc. Thus, the composition of the present invention not only provides a means for reducing the amount of costly pyrethrins used, but provides a spray which is more effective than those compositions utilizing pyrethrins alone in an oil base. Moreover, an OTI rating determined on a 10% solution of alkylated naphthalenes in the kerosene fraction was found to have an OTI rating of −38, indicating that the mutual solvent employed in the compositions of the present invention was not responsible in itself for the high killing effect of the composition of the present invention. Also, an OTI rating of a spray containing 5% ortho-nitrodiphenyl and 5% alkylated naphthalenes in a kerosene fraction was found to be −27, indicating therefore that ortho-nitrodiphenyl in itself does not provide sufficient toxicity when incorporated in an oil base together with a mutual solvent to give an adequate OTI rating.

Other substances, such as surface-active agents, anti-oxidants, inhibitors, light screening agents, adhesives and fixing agents may be incorporated in the compositions of the present invention without distinguishing from the invention as described and claimed.

We claim:

1. An insecticidal composition comprising 5–10% ortho-nitrodiphenyl, 20–50 mg. of pyrethrins per 100 cc. of composition, a deodorized petroleum oil spray base having a viscosity in the range of 60–100° Saybolt at 100° F., and an amount of ortho-phenylcyclohexanol sufficient to retain said ortho-nitrodiphenyl in solution in the oil base.

2. An insecticidal composition comprising 5–10% ortho-nitrodiphenyl, 20–50 mg. of pyrethrins per 100 cc. of composition, a deodorized petroleum oil spray base having a viscosity in the range of 60–100° Saybolt at 100° F., and an amount of a substance selected from the group consisting of ortho-phenylcyclohexanol and ortho-cyclohexylcyclohexanol sufficient to retain said ortho-nitrodiphenyl in solution in the oil base.

3. An insecticidal composition comprising 5–10% ortho-nitrodiphenyl, 20–50 mg. of pyrethrins per 100 cc. of composition, a deodorized petroleum oil spray base having a viscosity in the range of 60–380° Saybolt at 100° F., and an amount of a substance selected from the group consisting of ortho-phenylcyclohexanol and ortho-cyclohexylcyclohexanol sufficient to retain said ortho-nitrodiphenyl in solution in the oil base.

4. An insecticidal composition comprising 5–10% ortho-nitrodiphenyl, 20–50 mg. of pyrethrins per 100 cc. of composition, a deodorized petroleum oil spray base having a viscosity in the range of 60–380° Saybolt at 100° F., and an amount of ortho-phenylcyclohexanol sufficient to retain said ortho-nitrodiphenyl in solution in the oil base.

HENRY L. MORRILL.
CARL J. WEINMAN.

REFERENCES CITED

The following references are of record in the file of this patent:

UNITED STATES PATENTS

| Number | Name | Date |
|---|---|---|
| 2,347,265 | Hyman | Apr. 25, 1944 |
| 2,396,013 | Jones | Mar. 15, 1946 |
| 2,298,681 | Coleman | Oct. 13, 1942 |
| 2,355,974 | Harvill | Aug. 15, 1944 |
| 2,166,120 | Bousquet | July 18, 1939 |
| 2,348,976 | Hyman | May 16, 1944 |

OTHER REFERENCES

Bushland, Journal of Economic Entomology, vol. 33, No. 4, pages 669–676. (Copy in Div. 63.)